United States Patent
Mittal et al.

(10) Patent No.: US 10,013,347 B2
(45) Date of Patent: Jul. 3, 2018

(54) NON-BLOCKING PARALLEL MEMORY MECHANISMS

(71) Applicant: Sybase, Inc., Dublin, CA (US)

(72) Inventors: Rahul Mittal, Indore (IN); Amit Pathak, Pune (IN); Jay Sudrik, Pune (IN); Simhachala Sasikanth Gottapu, Dublin, CA (US)

(73) Assignee: SYBASE, INC., Dublin, CA (US)

( * ) Notice: Subject to any disclaimer, the term of this patent is extended or adjusted under 35 U.S.C. 154(b) by 455 days.

(21) Appl. No.: 14/923,513

(22) Filed: Oct. 27, 2015

(65) Prior Publication Data
US 2017/0116116 A1    Apr. 27, 2017

(51) Int. Cl.
G06F 12/02    (2006.01)
G06F 11/14    (2006.01)

(52) U.S. Cl.
CPC ...... G06F 12/0253 (2013.01); G06F 11/1469 (2013.01); *G06F 2212/1044* (2013.01)

(58) Field of Classification Search
CPC .................................................. G06F 12/0253
See application file for complete search history.

(56) References Cited

U.S. PATENT DOCUMENTS

| | | | |
|---|---|---|---|
| 9,032,410 B1 * | 5/2015 | Kumpera | G06F 9/485 718/102 |
| 2009/0019249 A1 * | 1/2009 | Kessler | G06F 9/5016 711/170 |
| 2009/0112953 A1 * | 4/2009 | Barsness | G06F 12/0269 |
| 2011/0125991 A1 * | 5/2011 | Annan | G06F 9/44594 713/2 |
| 2011/0185112 A1 * | 7/2011 | Goss | G06F 12/0246 711/103 |
| 2011/0185113 A1 * | 7/2011 | Goss | G06F 12/0253 711/103 |
| 2011/0231623 A1 * | 9/2011 | Goss | G06F 12/0253 711/159 |
| 2011/0246543 A1 * | 10/2011 | Gracie | G06F 12/0269 707/816 |
| 2012/0278564 A1 * | 11/2012 | Goss | G06F 12/0253 711/155 |
| 2013/0205183 A1 * | 8/2013 | Fillingim | G06F 11/1044 714/773 |
| 2015/0088844 A1 * | 3/2015 | Stigsen | G06F 17/30312 707/703 |

* cited by examiner

*Primary Examiner* — Kris E Mackes

(57) ABSTRACT

A transaction descriptor associated with a vertical chain of row versions is received. The vertical chain of row versions is traversed. The vertical chain is part of a grid structure formed by a number of vertical chains intersected with a number of horizontal chains. A link to a current row version is terminated. A link from the current row version to an older row version in a horizontal chain is locally stored and terminated. The older row version is set as ready for garbage collection. The current row version is set as ready for garbage collection. A link from the current row version to a next row version in the horizontal chain is locally stored and terminated. The next row version is appointed as current.

20 Claims, 8 Drawing Sheets

NON-BLOCKING PARALLEL MEMORY MECHANISMS

FIELD

Embodiments described herein generally relate to automatic management or maintenance of a heap data structure, which includes reclaiming memory resources and reorganizing of memory space storing data objects, as well as traversing and setting/tagging each data object in a heap data structure which are accessible by a computer program.

BACKGROUND

Memory management typically involves automatic and manual techniques for removing objects that are no longer needed from memory. Garbage collection (GC) is a dynamic approach for automatic memory management to process and identify obsolete memory objects. Typically, database management systems (DBMS) apply the GC approach as part of services provided for databases. Relational database management systems (RDBMS) are a type of DBMS where information is organized by relations. Software systems that maintain relational databases may be described as RDBMS. Data in relational databases is organized into rows and columns. Generally, each object in a relational database has its own table with rows of the table representing instances of that type of object and columns of the table representing values attributed to an instance of the object. Processes executed by a DBMS over a database is measured through units called transactions. A transaction generally represents any change in the database. Transactions state that each process unit executed in a database must either be entirely completed or have no effect over the database. RDBMS are capable of maintaining databases stored on hard disk drives (HDDs) and solid state drives (SSDs), as well as in-memory databases that are stored in main memory. In-memory databases provide faster performance in comparison with disk-based databases due to eliminated seek time when querying data. However, in-memory databases depend heavily on main memory that has finite capacity. It is challenging to perform timely GC over big scale installations where hundreds of database engines run in parallel and perform thousands of transactions per second.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for non-blocking parallel memory mechanisms are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

RDBMS provides for creation, update, and administration of relational databases. In addition to RDBMS where related data is organized into rows and columns that form data tables, various implementations of RDBMS adopt slightly different approach. An example of such implementation is SAP Adaptive Server Enterprise (SAP ASE®). This relational database management system (RDBMS) stores rows in a fragment memory pool instead in data tables on data pages. A newer version of a row may have different size than older version of the row. Thus, when the row is modified, the newer version of the row is created while the database system still maintains older versions linked through a singly linked list. Singly linked lists start at a version that is most recent and end at the older version that is maintained. A singly linked list is a data structure where each node stores contents and a pointer (e.g., a link) to a next node in the list. The last node in the singly linked list has no pointer, this indicates that this is the last node.

Additionally, new versions of one or more rows that are created by a single transaction are also linked through a singly linked list. Singly linked lists that link versions of multiple rows created by a particular transaction are represented by vertical chains. A grid structure containing multiple row versions of different rows is formed by intersecting a number of horizontal chains with a number of vertical chains. The horizontal chains represent singly linked lists that link versions of a particular row. Thus, a row version from the number of row versions in the grid structure participates independently in two singly linked lists—a horizontal chain and a vertical chain.

Figure 1:
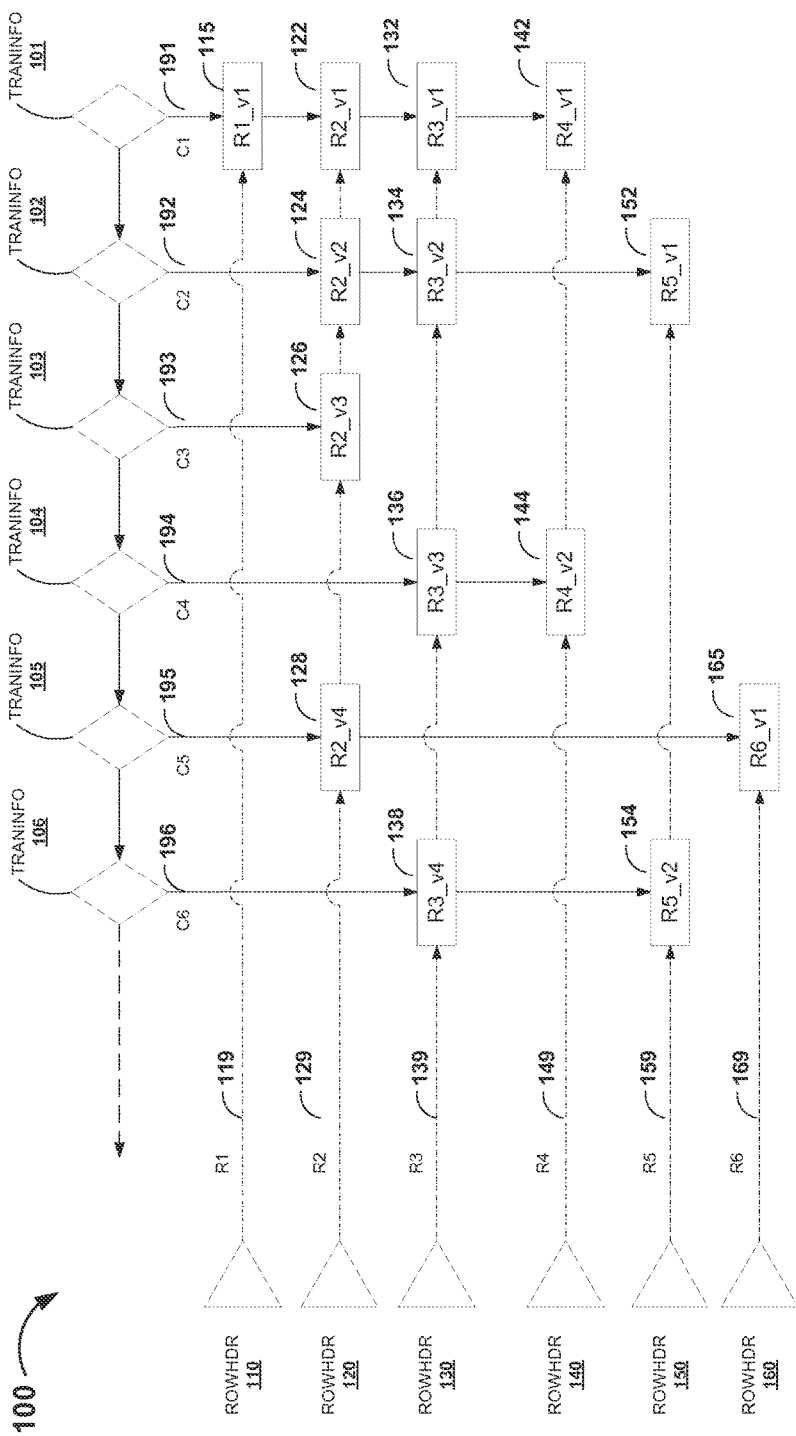
FIG. 1 is a block diagram illustrating a grid structure, according to one embodiment.

FIG. 1 illustrates a grid structure 100, according to an embodiment. Grid structure 100 is formed by intersecting a plurality of vertical chains and a plurality of horizontal chains. Vertical chains are created upon completion of transactions. Vertical chains are formed by versions of the same or different rows, the versions created by the same transaction. A vertical chain starts at a transaction descriptor (TRANINFO). A transaction descriptor is a memory structure that represents a transaction. A transaction descriptor includes a pointer (e.g., a link) to a first node from a plurality of nodes. The plurality of nodes is created by the transaction that is represented by the transaction descriptor. A vertical chain represents a data structure where each node includes a pointer to a next node in the data structure. In one embodiment, a vertical chain may be a singly linked list data structure. The TRANINFO includes a pointer to a first row version from the respective vertical chain. Grid structure 100 includes transaction descriptors "TRANINFO" 101, "TRANINFO" 102, "TRANINFO" 103, "TRANINFO" 104, "TRANINFO" 105, and "TRANINFO" 106, each pointing to a vertical chain of one or more row versions.

The TRANINFO points to a vertical chain that includes row versions of different rows from the grid structure. For example, "TRANINFO" 101 includes a pointer to row version "R1_v1" 115. Row version "R1_v1" 115 is first in vertical chain "C1" 191 of row versions that includes "R1_v" 115, "R2_v1" 122, "R3_v1" 132, and "R4_v1" 142. In addition, row version "R1_v1" 115 is also part of horizontal chain "R1" 119 that includes row versions of one particular row ("R1"). In this particular case, row version "R1_v1" 115 is the only row version of row "R1" 119. Similarly, "TRANINFO" 102 includes a pointer to row version "R2_v2" 124 that is first in vertical chain "C2" 192 including "R2_v2", "R3_v2" and "R5_v2". Further, row version "R2_v2" 124 is part of horizontal chain "R2" 129. Horizontal chain "R2" 129 includes row versions "R2_v1", "R2_v2", "R2_v3", and "R2_v4" of a particular row ("R2").

Versions of the same row are created by different transactions, and are part of different vertical chains, according to one embodiment. For example, "R2_v1" and "R2_v2" are two versions of the same row ("R2"). Row version "R2_v1" is older row version of the horizontal chain "R2" 129 and row version "R2 v2" is newer row version in the horizontal chain "R2" 129. Versions of the same row form a horizontal chain of row versions. In one embodiment, a horizontal chain may be a data structure of nodes, where each node represents a row version and includes a pointer to a next node in the data structure. For example, similarly to vertical chains, horizontal chains can be singly linked list data structures. A row header, such as row headers "ROWHDR" 110-160, points to each horizontal chain in the grid structure 100.

Grid structure 100 may be part of an in-memory database, according to one embodiment. A garbage collection (GC) mechanism may be applied to enable instant garbage collection of row versions that are obsolete. A row version becomes irrelevant or obsolete as soon as a newer version of the same row is created by a committed transaction. The garbage collection mechanism may be initiated when a transaction descriptor (TRANINFO) of a completed transaction is provided to a thread. For example, "TRANINFO" 102 may be provided to a thread for processing.

A thread is a sequence of programmed instructions managed by an operating system. Multiple threads may be part of a single process. Threads may be executed concurrently, that is one starting before others finish. Upon reception of "TRANINFO" 102, the thread extracts a pointer (e.g., link) to row version "R2_v2" 124 from the "TRANINFO" 102. Row version "R2 v2" 124 is first in a vertical chain of row versions pointed by transaction descriptor "TRANINFO" 102, according to one embodiment.

Upon extraction of the pointer to row version "R2_v2" 124, the thread caches the pointer in a local variable. For example, the pointer to row version "R2_v2" 124 may be cached in a local variable "ver". The cached pointer specifies a memory path to row version "R2_v2" 124. Upon caching, the thread nullifies the pointer, according to one embodiment. Next, the thread appoints row version "R2_v2" 124 as current. Row version "R2_v2" 124 may be part of two separate singly linked list data structures, a horizontal and a vertical, and therefore, may include one pointer to next row version for each of the singly linked list data structures, according to one embodiment. For example, row version "R2_v2" 124 may include one pointer to row version "R3_v2" 134 that participates in the vertical singly linked list data structure "C2" 192 pointed by "TRANINFO" 102. At the same time, row version "R2_v2" 124 may include a separate pointer to older row version "R2_v1" 122 that participates in a horizontal singly linked list "R2" 129 pointed by "ROWHDR" 120. Both, row version "R3_v2" 134 and row version "R2 v1" 122, can be considered as a next row version to the row version "R2_v2" 124 in the respective singly linked list data structure.

Upon appointing "R2_v2" 124 as current row version, the thread may cache pointers to row versions "R3_v2" 134 and "R2_v1" 122 in local variables and then nullify the pointers, according to one embodiment. For example, pointers to row versions "R3_v2" 134 and "R2_v1" 122 may be stored in local variables "v_next" and "v_old", respectively. Pointers to row versions "R3_v2" 134 and "R2_v1" 122 specify memory paths to the row versions. Upon removing the pointers from row version "R2_v2" to row versions "R3_v2" 134 and "R2 v1" 122, the thread can visit row version "R2 v1" 122 that is an older version of the current "R2 v2" 124.

In one embodiment, the thread can determine garbage collection status of row version "R2_v1" 122. Row version "R2_v1" 122 garbage collection status may be set as ready for garbage collection ("GC ready"). In case row version "R2_v1" 122 is not set as "GC ready", the thread may set row version "R2_v1" 122 as "GC ready". For example, a compare-and-swap (CAS) functionality may be implemented to enable the thread to execute both operations as atomic block of code that may not be divided. Thus, the thread performs a status check for an expected value and, if necessary, changes the value in a single process. Such functionality ensures seamless concurrent traversal of a number of vertical chains by a number of threads. Since the CAS operation is performed at once, the possibility to be interrupted by another operation is eliminated.

Upon visiting older row version "R2_v1" 122, the thread goes back to current row version "R2 v2" 124 and determines if the current version "R2 v2" 124 is set as "GC ready". Similarly to "R2_v1" 122, the thread may set current row version "R2_v2" 124 as "GC ready" upon determining that current row version "R2_v2" 124 is not set as "GC ready".

In one embodiment, the thread may determine that older row version "R2_v1" 122 is already set as "GC ready". Further to being part of the horizontal chain "R2" 129 pointed by "ROWHDR" 120, older row version "R2_v1" 122 is part of the vertical chain "C1" 191 of "TRANINFO" 101. The older row version "R2_v1" 122 may be set as "GC ready" by another thread that traverses vertical chain "C1" 191 pointed by "TRANINFO" 101. In such a case, older row version "R2_v1" 122 may be directly deleted from memory to free space for new row versions. Similarly, current row version "R2_v2" 124 may also be determined set as "GC ready" and therefore to be directly deleted from memory.

The thread may traverse the vertical chain "C2" 192 hanging off transaction descriptor "TRANINFO" 102 by appointing row version "R3_v2" 134 as current row version upon complete processing of row version "R2_v2" 124. New current row version "R3_v2" 134 may include pointers to next version "R5_v1" 152 of the vertical list data structure "C2" 192 and to older version "R3_v1" 132 of horizontal list data structure "R3" 139 pointed by "ROWHDR" 130. Pointers may be cached and nullified as described above with reference to row version "R2_v2" 124, according to one embodiment.

One skilled in the art will recognize, however, that methods different from CAS may be implemented in order to determine whether a row version is ready to be garbage collected. A thread may traverse row versions in the vertical singly linked list data structure in accordance with the described mechanism: one by one, by appointing a next row version as current and visiting respective older row versions that reside on the same horizontal singly linked list data structure (horizontal chain) as the currently appointed row version.

Multiple threads may receive transaction descriptors, such as "TRANINFO" 101-106, that point to different vertical chains of row versions. The multiple threads can traverse the vertical chains in parallel, according to one embodiment. Garbage collection mechanism enables threads to run in parallel by performing compare-and-swap (CAS) as an atomic operation. Due to the atomic CAS operation, the mechanism ensures that a thread never blocks or is blocked by another thread. Since the atomic CAS operation performed by a thread over an element cannot be interrupted by a next visiting thread, a next thread would simply determine that an element is set as GC ready and remove it from memory. Thus, concurrency between every two threads is solved. In combination with parallel traversal of vertical chains, this enables fast and non-blocking processing of threads that apply the mechanism over the vertical chains across the grid structure 100. Benefits include less memory accesses (as low as 2) to a single memory object, no thread blocks, and instant garbage collection of obsolete row versions. Moreover, described mechanism prevents a latest version of being accidentally deleted from memory without performing any additional computations or checks. Rather, simply by ensuring that a row version is deleted in case it is already set as GC ready by another thread. According to described mechanism, such case is possible when a thread traverses a vertical chain that includes a newer version of the same row.

Above described methodology ensures that a row version from the grid structure 100 is accessed at most twice during the lifetime of the row version. A single thread may access a particular row version only once to set or delete the row version. The thread can determine if the row version is set as "GC ready" and delete the row version from memory or set it as "GC ready". At most two threads can access the row version during lifetime. A first thread to set the row version as "GC ready" and a second thread to garbage collect the row version. All pointers to the row version are removed before deleting the row version. Thus, no stale pointers are left in the database upon garbage collection of the row version.

Further, as per described mechanism, the latest version of a row may never be garbage collected and deleted from memory. When a thread traverses vertical list data structures, the latest version of a row is visited and set as "GC ready". However, the latest version of the row may not be garbage collected until a new version of the same row is created by a completed transaction.

In one embodiment, a transaction may be partially completed and therefore a row version may be set as "rolled back" version. In such case, the "rolled back" version may not exist in the horizontal chain of row versions. The "rolled back" version may exist in the vertical chain of row versions. Thus, when traversing the vertical chain, a thread may directly delete the row version from memory upon determining that the row version is set as "rolled back".

Although presented garbage collection mechanism is described with reference to a database row version store environment, one skilled in the art will recognize that the above described garbage collection mechanism may be applied over a two dimensional (2D) grid structure.

In various embodiments, elements stored in an N-dimensional grid structure may be garbage collected as per the described mechanism. For example, a counter with N>2 may be utilized instead setting an element as GC ready. In a N-dimensional grid structure, an object could exist in at most N singly linked lists. When an object is created, the counter is initialized to value "0". When this object is added to a singly linked list, the counter value is automatically incremented. For example, the counter may be implemented via CAS mechanism. When the object is added to all required singly linked lists (that can be at most N), the object is queued for garbage collection. A GC thread running above described mechanism visits the object through each of the singly linked lists the object participates in. When visiting the object, the GC thread removes the object from the respective singly linked list and automatically decrements the counter value by one. The object is deleted from memory by a GC thread that decrements the counter value from "1" to "0". Therefore, only one GC thread would do the actual deletion of the object from memory because only one GC thread can cause the counter value to become "0".

Figure 2:
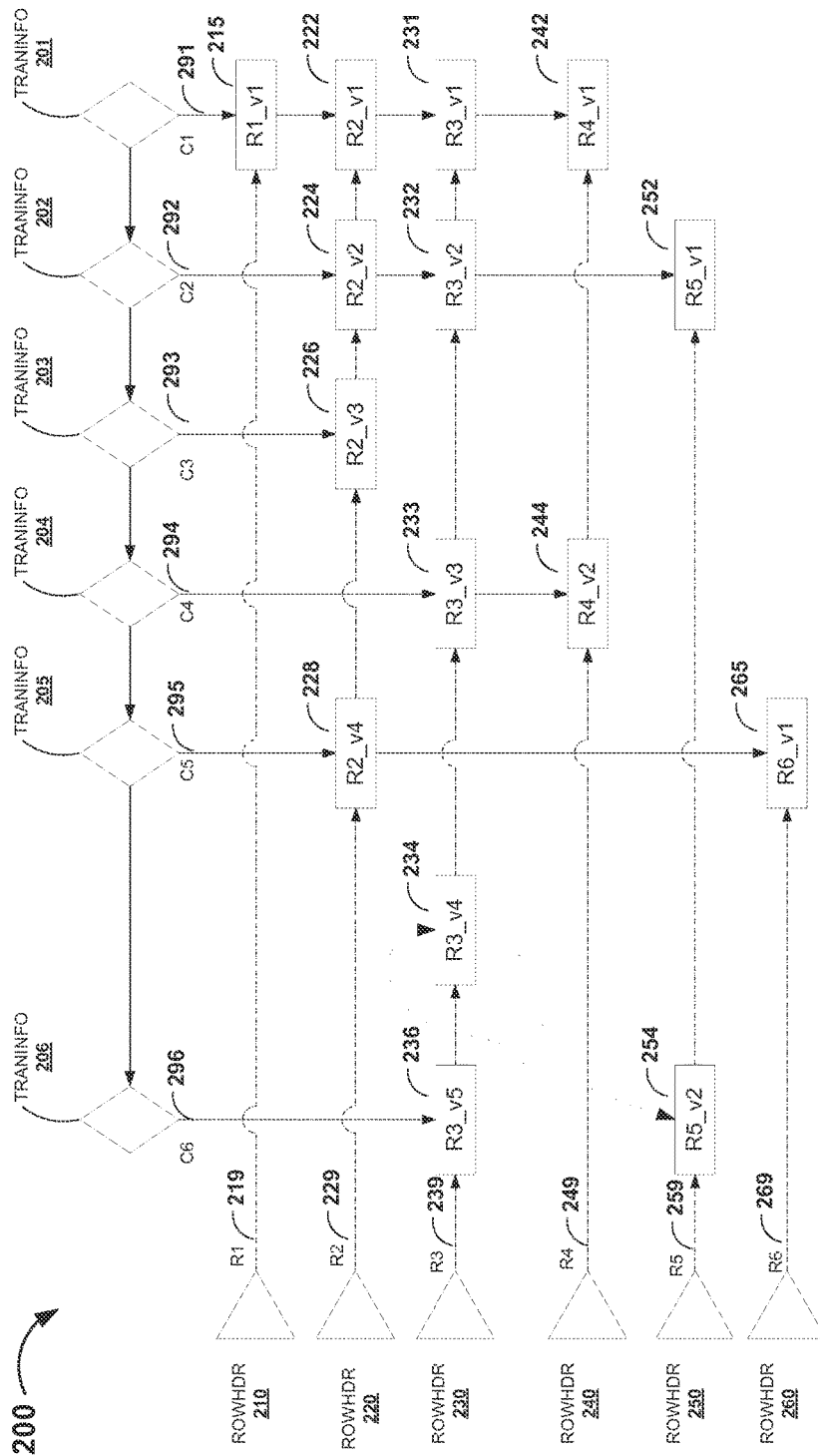
FIG. 2 is a block diagram illustrating a grid structure, including more than one row version of a particular row that is created by a single transaction, according to one embodiment.

FIG. 2 illustrates a grid structure 200 formed by intersecting a number of vertical chains and a number of horizontal chains. Grid structure 200 includes similar elements as grid structure 100. One or more garbage collection threads traverse vertical chains of grid structure 200 in accordance with the garbage collection mechanism described above with reference to FIG. 1. A single transaction may update a particular row more than once. That is, a single transaction may create more than one version of a particular row. In addition to the elements of grid structure 100, grid structure 200 includes "TRANINFO" 206 that points to row versions "R3_v4" 234, "R3_v5" 236 and "R5_v2" 254, where row versions "R3_v4" 234 and "R3_v5" 236 are part of the same row "R3" 239 that is referenced by "ROWHDR" 230, according to one embodiment.

A thread traverses the vertical singly linked list data structure "C6" 296 pointed by "TRANINFO" 206 in accordance with the garbage collection mechanism described with reference to FIG. 1. A pointer (e.g., link) to a first row version in the vertical chain "C6" 296 is extracted from "TRANINFO" 206. The pointer may be cached locally, for example in a local variable "ver", and nullified by the processing thread. Next, row version "R3_v5" 236 is appointed as current version. Row version "R3_v5" 236 is accessed prior to row version "R3_v4" 234 since it is newer. Row version "R3_v5" 236 includes a pointer to an older version in the horizontal chain "R3" 239 and a pointer to a next version in the vertical chain "C6" 296.

Both pointers may be cached in local variables and nullified by the thread. The thread may check if the row version "R3_v5" 236 is set as "GC ready" and set it as "GC ready" upon determining that the row version "R3_v5" 236 is not set. Since row version "R3_v4" 234 is an older row version of "R3_v5" 236 in the horizontal chain of row versions "R3" 239 referenced by "ROWHDR" 230, "R3_v4" 234 may be automatically checked and set as "GC ready" along with current row version "R3_v5" 236. The thread may extract path to the older row version "R3_v4" 234 from the locally cached pointer. Further, when traversing the vertical chain "C6" 296 referenced by "TRANINFO" 206, the processing thread appoints the next row version as current.

In one embodiment, the thread reads the locally cached pointer to extract a memory path to a next row version in the vertical chain. Row versions "R3_v5" 236 and "R3_v4" 234 are versions of the same row "R3" 239 created by a single transaction. Therefore, both pointers in row version "R3_v5" 236, that point to the next row version in the vertical chain "C6" 296 of "R3_v5" 236 and to the older row version in the horizontal chain "R3" 239 of "R3_v5" 236, actually point to the same row version (i.e., row version "R3_v4" 234). Thus, by appointing the next row version as current, in accordance with the presented garbage collection (GC) mechanism in FIG. 1, the processing thread may access row version "R3_v4" 234. Row version "R3_v4" 234 may represent a next row version of row version "R3_v5" 236 in both the horizontal and the vertical singly linked list data structures that include row version "R3_v5" 236, according to one embodiment.

Upon appointing row version "R3_v4" 234 as current, the thread initializes the GC mechanism. The processing thread caches locally the pointer from the row version "R3_v4" 234. Then, the thread nullifies the pointer to the next row version in the vertical chain "C6" 296 of current row version "R3_v4" 234 and the pointer to an older row version in the horizontal chain "R3" 239 of current row version "R3_v4" 234. Next, the thread visits an older version in the horizontal chain "R3" 239 of current row version "R3_v4" 234 (in this case the older version in the horizontal chain "R3" 239 is "R3_v3" 233) and tries to set the older version as "GC ready" if not already set. In one embodiment, upon execution of the CAS operation over older row version "R3_v3" 233, the thread returns to current row version "R3_v4" 234 to execute the CAS operation. However, current row version "R3_v4" 234 was already set as "GC ready" during the previous iteration of the GC mechanism over row version "R3_v5" 236. Therefore, the thread determines that current row version "R3_v4" 234 is ready for garbage collection and deletes the current row version "R3_v4" 234 from memory.

Figure 3:
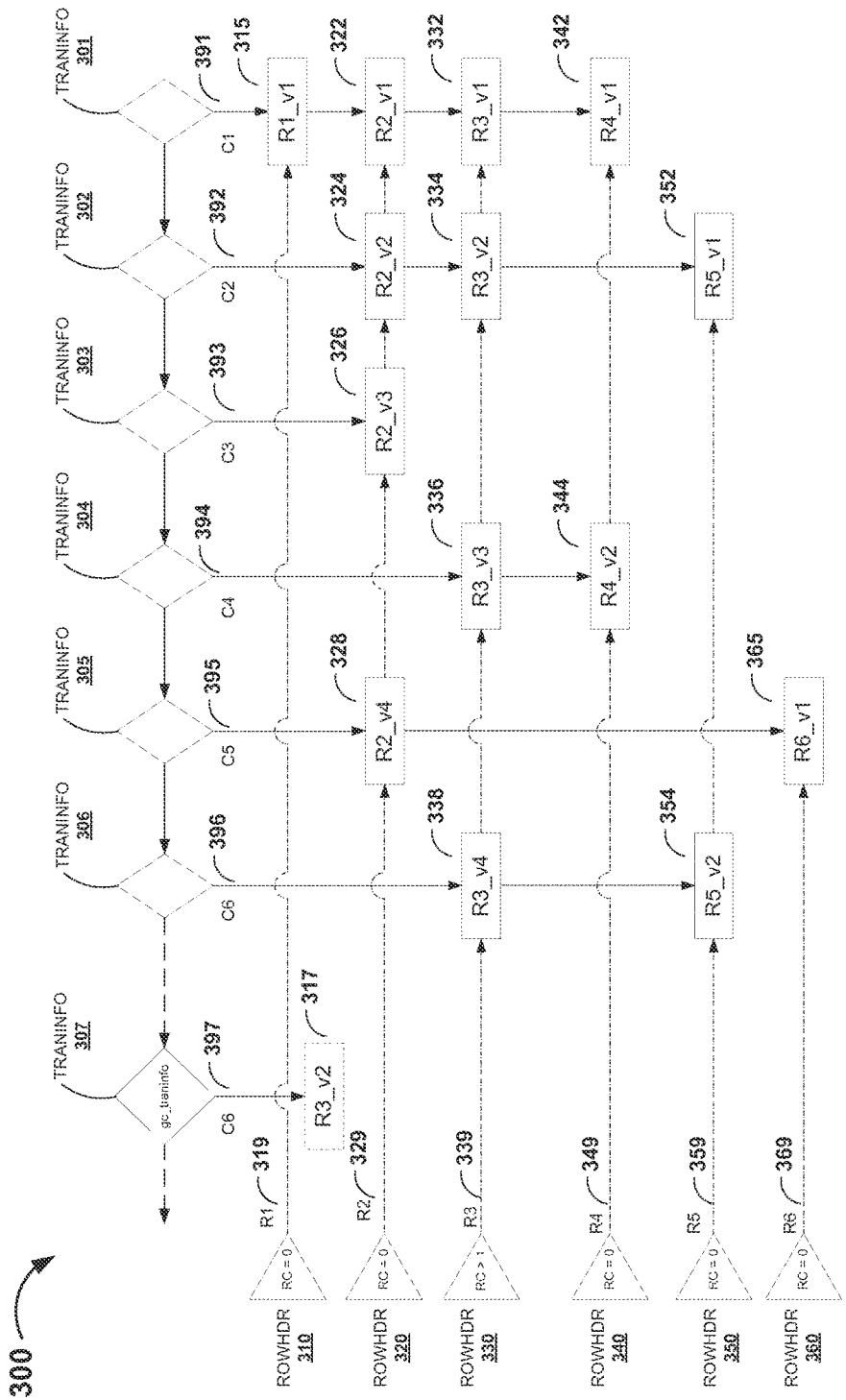
FIG. 3 is a block diagram illustrating a grid structure, including a vertical chain that links versions referenced by a scanner, according to one embodiment.

FIG. 3 illustrates a grid structure 300 formed by intersecting a number of vertical chains and a number of horizontal chains. Grid structure 300 includes similar elements as grid structure 100. "TRANINFO" 302 is assigned to a thread for processing. "TRANINFO" 302 includes a pointer to row version "R2_v2" 324 that is first in a vertical chain of row versions "C2" 392. Upon extraction of the pointer to row version "R2_v2" 324, the thread may cache the pointer in a local variable. For example, the pointer to row version "R2_v2" 324 may be cached in local variable "ver". The cached pointer specifies a memory path to row version "R2_v2" 324. Upon caching, the thread nullifies the pointer. Next, the thread appoints row version "R2_v2" 324 as current. Row version "R2_v2" 324 is part of two separate singly linked list data structures, horizontal ("R2" 329) and vertical ("C2" 392). Therefore, row version "R2_v2" 324 includes one pointer to a next row version for each of the singly linked list data structures, according to one embodiment. For example, row version "R2_v2" 324 may include one pointer to row version "R3_v2" 334 that participates in the vertical singly linked list data structure (vertical chain "C2" 392) pointed by "TRANINFO" 302. At the same time, row version "R2_v2" 324 may include a separate pointer to older row version "R2_v1" 322 that participates in a horizontal singly linked list data structure (horizontal chain "R2" 329) pointed by "ROWHDR" 320. Both row version "R3_v2" 334 and row version "R2_v1" 322 may represent a next row version to the row version "R2_v2" 324 in the respective singly linked list data structure.

Upon appointing of "R2_v2" 324 as a current row version, the thread caches pointers to row versions "R3_v2" 334 and "R2_v1" 322 in local variables and nullifies the pointers, according to one embodiment. For example, pointers to row versions "R3_v2" 334 and "R2_v1" 322 may be stored in local variables "v_next" and "v_old", respectively. Pointers to row versions "R3_v2" 334 and "R2_v1" 322 specify memory paths to the row versions. Upon removing pointers, the thread visits row version "R2 v1" 322 that is an older version of the current "R2 v2" 324. In one embodiment, the thread may check if row version "R2_v1" 322 is set as ready for garbage collection ("GC ready"). In case row version "R2_v1" 322 is not set, the thread sets row version "R2_v1" 322 as "GC ready". For example, a compare and swap (CAS) functionality may be implemented to enable the thread to execute both operations as atomic block of code that may not be divided. Thus, the thread performs a status check for an expected value and, if necessary, changes the value in a single process. Such functionality provide for seamless concurrent traversal of a number of vertical chains by a number of threads. Since the CAS operation is performed at once, the possibility to be interrupted by another operation is eliminated.

Upon visiting older row version "R2_v1" 322, the thread may go back to current row version "R2 v2" 324 and determine if the current version "R2 v2" 324 is set as "GC ready". Similarly to "R2_v1" 322, the thread may set current row version "R2_v2" 324 as "GC ready" upon determining that current row version "R2_v2" 324 is not set as "GC ready".

In one embodiment, the thread may determine that older row version "R2_v1" 322 is already set as "GC ready". In such case older row version "R2_v1" 322 may be directly deleted from memory to free space for new row versions. Similarly, current row version "R2_v2" 324 may also be determined set as "GC ready" and therefore directly deleted from memory.

The vertical chain "C2" 392 hanging off transaction descriptor "TRANINFO" 302 may be traversed by the thread by appointing row version "R3_v2" 334 as current row version upon complete processing of row version "R2_v2" 324. New current row version "R3_v2" 334 may include pointers to next version "R5_v1" 352 of the vertical list data structure "C2" 392 and to older row version "R3_v1" 332 of horizontal list data structure "R3" 339 pointed by "ROWHDR" 330. Pointers may be cached and nullified as described above with reference to row version "R2 v2" 324, according to one embodiment.

In addition to elements of grid structure 100, grid structure 300 includes "TRANINFO" 307. "TRANINFO" 307 is a transaction descriptor representing a transaction that created vertical chain "C6" 397. "TRANINFO" 307 points to a row version "R3_v2" 317 that represents a reference to row version "R3_v2" 334. Further, row headers "ROWHDR" 310-360 include reference counters (RCs). A reference counter is a count of how many references (e.g., pointers or links) there are to a particular memory block from other blocks. A reference counter (RC) is stored in memory for each object. The RC is incremented for each new reference and is decremented if the referring object is removed.

When a thread traversing a vertical chain appoints a next row version as current, a new iteration of the garbage collection mechanism is initialized. The thread determines a scan status of the respective row by checking an RC in the row header. For example, upon appointing row version "R3_v2" 334 as a current row version, the RC of the corresponding "ROWHDR" 330 is checked to determine if there are any references to the "ROWHDR" 330. The thread checks the RC to synchronize with a scanner that may possibly be active on the referenced row.

A scanner may scan a row for a particular older version of the row. For example, the older version may be needed for multiversion concurrency control (MVCC). MVCC is a common way to increase concurrency and performance by generating a new version of a database object each time the object is written. For example, by generating a new row version each time a row is updated by a transaction.

When a scanner is active on a row, the RC of the row is incremented, according to one embodiment. The RC may be incremented via a number of increment constructions, For example, the RC value may be incremented via an atomic increment construct provided by a compiler. By default RC is zero (0). Upon determining that the RC of "ROWHDR" 330 is bigger than zero, the thread creates a new transaction descriptor, such as "TRANINFO" 307. Further, the thread skips the garbage collection for the current row version "R3_v2" 334 and proceeds with the next row version in the vertical chain "C2" 392 that is currently traversed. The current row version "R3_v2" 334 is linked to "TRANINFO" 307 (gc_traninfo) forming vertical chain "C6" 397 as illustrated with "R3_v2" 317. The "TRANINFO" 307 (gc_traninfo) is then queued to the number of transaction descriptors "TRANINFO" 301-306 that are to be traversed by one or more threads that form a garbage collection subsystem.

Figure 4:
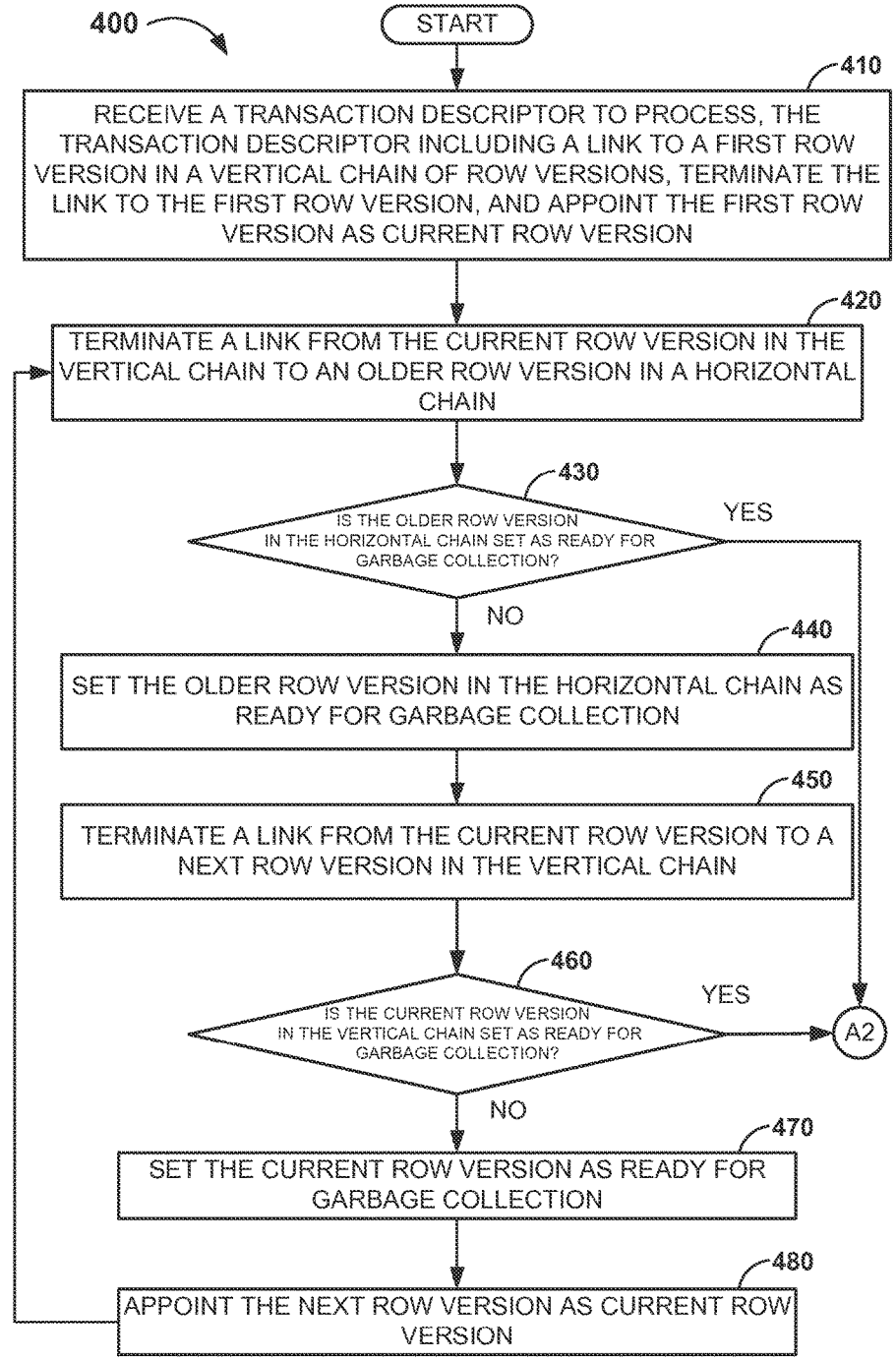
FIG. 4 is a flow diagram illustrating a generalized process to traverse a vertical chain of row versions, according to one embodiment.

FIG. 4 illustrates process 400 that represents general steps for traversing a vertical chain of row versions, according to one embodiment. Process 400 describes the processes that are executed by a thread over a row version that is appointed as a current row version. At 410, a transaction descriptor is received for processing. For example, "TRANINFO" 102 of FIG. 1 is received for processing. The transaction descriptor includes a link (a pointer) to a first row version from a vertical chain of row versions. With reference to FIG. 1, "TRANINFO" 102 includes a pointer to row version "R2_v2" 124 that is first in vertical chain "C2" 192. The link to the first row version is terminated to ensure that no pointers to row version "R2_v2" 124 are left upon garbage collection of row version "R2_v2" 124. The first row version (with reference to FIG. 1, row version "R2_v2" 124) is automatically appointed as current. At 420, the link from the current row version to an older version from a horizontal chain is terminated. Links to row versions are terminated to ensure that no stale pointers that point to an empty space in memory are left upon deleting a row version. At 430, it is checked if the older row version is set as ready for garbage collection ("GC ready").

In one embodiment, it may be determined that the older row version is set as "GC ready" and therefore process A2 may be initiated. Upon determining that the older row version is not set as "GC ready", at 440, the older row version is set as "GC ready". In one embodiment, step 430 and step 440 of process 400 may be performed sequentially to traverse a vertical chain of row versions, as an atomic operation, to ensure that process 400 is not interrupted at this stage. Thus, concurrency between two threads, that may visit a particular row version at the same time, is solved. Process 400 continues at 450, where a link from the current row version to a next version in the vertical chain is terminated.

At 460, it is checked whether the current row version is set as "GC ready". In one embodiment, it may be determined that the current row version is set as "GC ready" and therefore the process A2 may be initiated. When it is determined that the current row version is not set as "GC ready", at 470, the current row version is set as "GC ready". In one embodiment, step 460 and step 470 of process 400 may be performed sequentially to traverse a vertical chain of row versions, as an atomic operation, to ensure that the process 400 is not interrupted at this stage. Thus, concurrency between two threads, that may visit a particular row version at the same time, is solved. At 480, the next row version is appointed as current row version. Upon appointing the next row version as current row version, steps 420-480 of process 400 are executed over the next row version that is currently appointed as current row version.

Figure 5A:
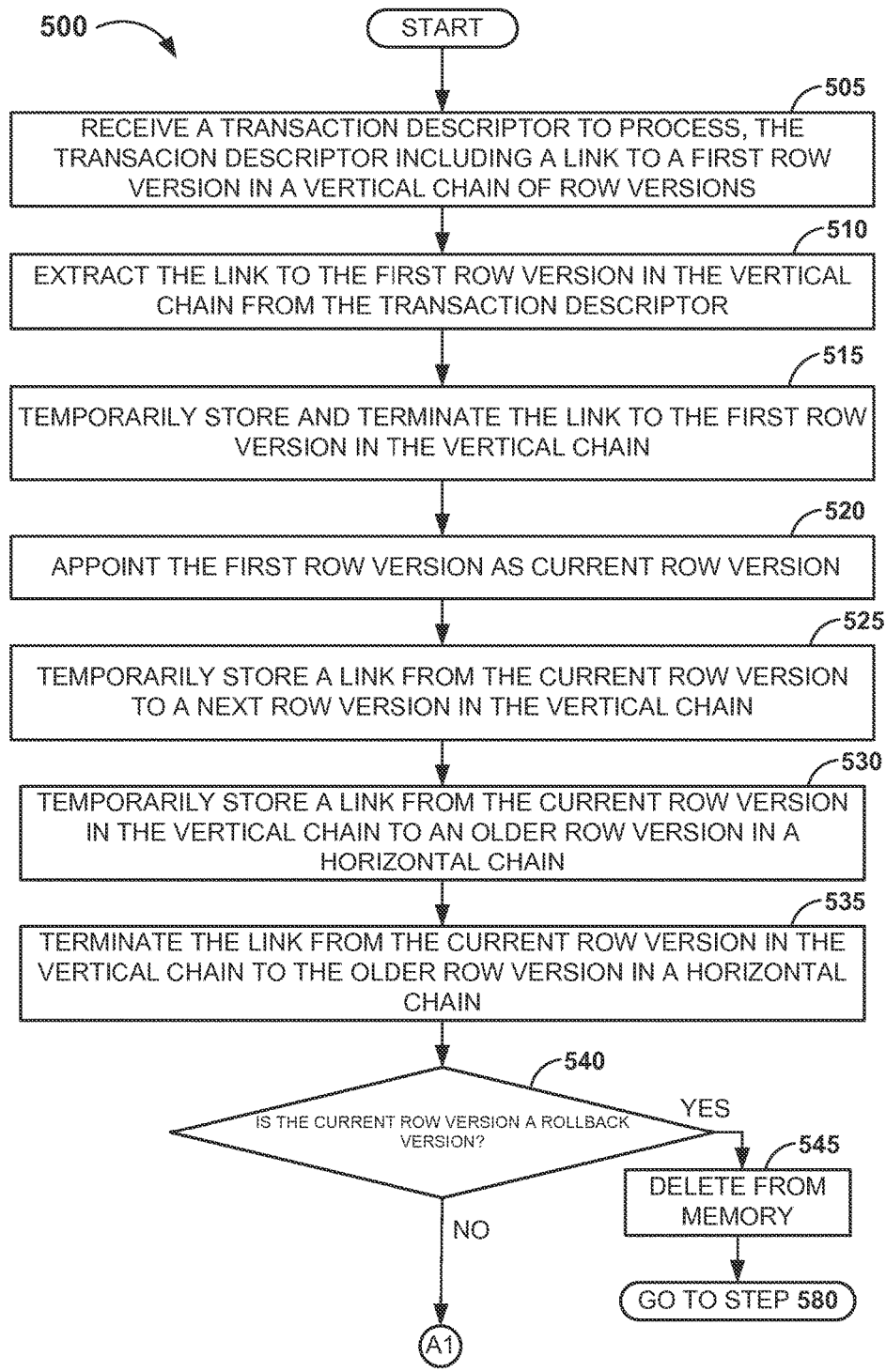
FIGS. 5A-B are flow diagrams illustrating a process to traverse a vertical chain of row versions, according to one embodiment.
Figure 5B:
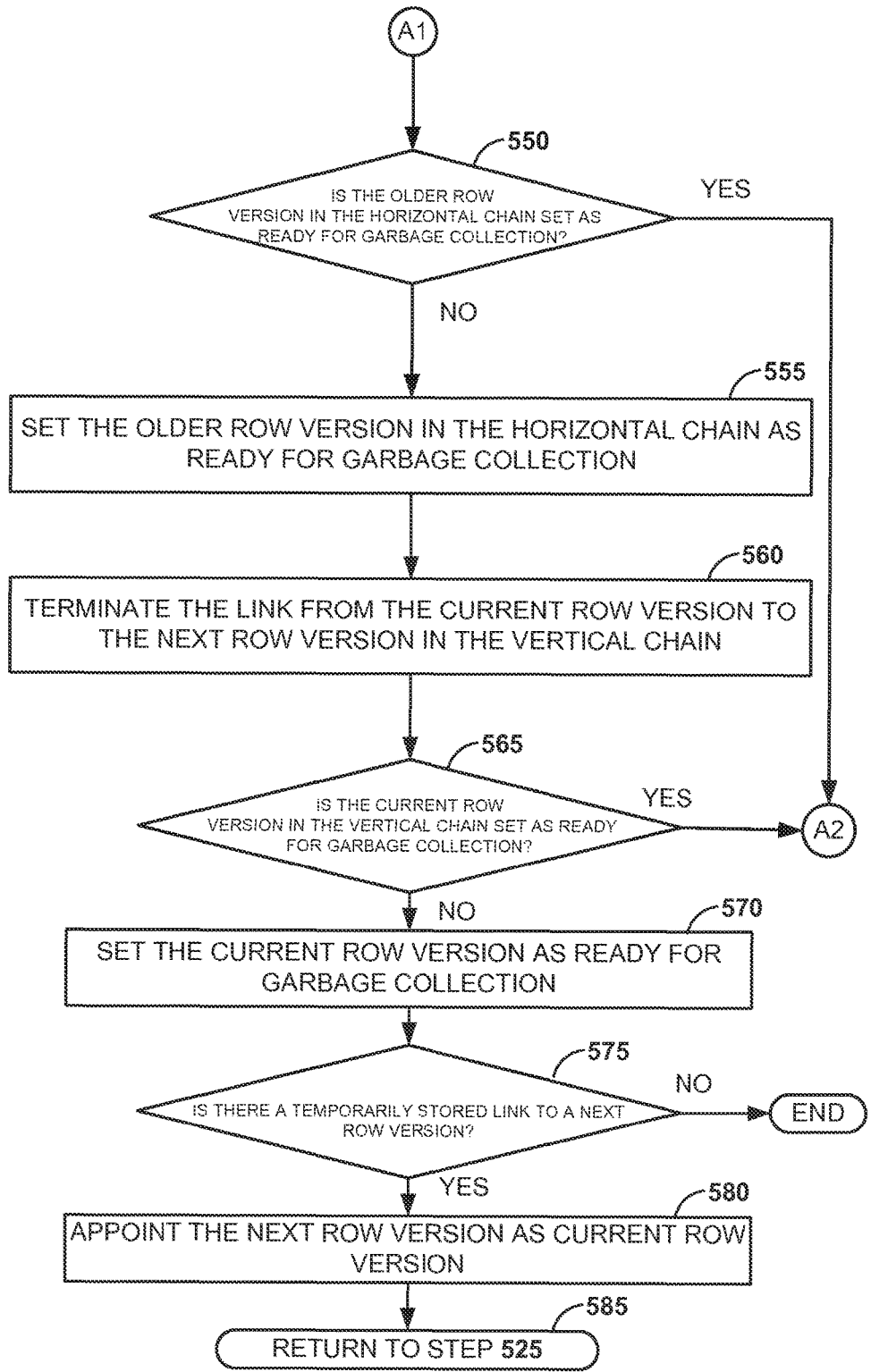

FIGS. 5A-B illustrate two parts of a process 500 to traverse a vertical chain of row versions. Process 500 describes in detail the processes that are executed by a single thread against a current row version. At 505 (FIG. 5A) a transaction descriptor of a transaction is assigned to a thread. For example, transaction descriptor "TRANINFO" 102 is assigned to a thread. The transaction descriptor includes a link (a pointer) to a first row version in a vertical chain of row versions. With reference to FIG. 1, "TRANINFO" 102 includes a pointer to row version "R2_v2" 124 that is first in vertical chain "C2" 192. The vertical chain of row versions represents a vertical singly linked list data structure. At 510, the link to the first row version is extracted from the transaction descriptor. The extracted link determines memory path to the first row version. Upon extraction, at 515, the link is temporarily stored in a local variable, for example "ver". The link to the first row version is terminated. By terminating and removing links to row versions, the garbage collection (GC) mechanism overcomes a potential problem with stale pointers and links that may occur upon garbage collection of the row versions. At 520, the first row version is appointed as current row version by the thread.

At 525, a link (pointer) from the current row version to a next row version is temporarily stored. The pointer from the current row version to the next row version may be stored in a local variable, for example "v_next". Next row version is part of the vertical chain of the current row version.

Upon storing the link to the next row version in a local variable, at 530, the thread proceeds with the GC mechanism by temporarily storing a pointer from the current row version to an older row version. The older row version is part of the horizontal chain of the current row version. In one embodiment, the pointer to the older row version is temporarily stored in a local variable called "v_old". At 535, the link from the current row version to the older version is terminated.

Next, at 540, it is determined whether the current row version is a rollback version. The current row version may be set as rollback version if it is created by a rollback transaction. A rollback transaction is a transaction that has been interrupted before committing. Row versions created by a rollback transaction are automatically set as rollback versions. Rollback versions participate in vertical singly linked list data structures (chains) that are created by a transaction but are removed from horizontal singly linked list data structures. At 545, upon determining that the current row version is set as rollback version, the current row version is deleted from memory. Process 500 continues at 580, where the next row version is appointed as current row version. Then, at 590, process 500 is re-initiated from 525 onwards and executed for the row version that is currently appointed as current row version.

Upon determining that the current row version is not set as rollback version, at 550 (FIG. 5B), it is determined whether the older row version is set as "GC ready". Upon determining that the older row version is not set as "GC ready", at 555, the older row version is set as "GC ready". In one embodiment, step 550 and step 555 may be performed sequentially, as an atomic operation, to ensure that the process 500 is not interrupted at this stage. For example, steps 550 and 555 may be performed via a compare and swap (CAS) atomic operation.

In one embodiment, it may be determined that the older row version is set as "GC ready" and therefore process A2 (process 600) is initiated.

At 560, the link from the current row version to the next row version is terminated to ensure that no stale links are present in the memory upon garbage collection of the next row version. Next, at 565, it is determined whether the current row version is set as "GC ready". Upon determining that the current row version is not set as "GC ready", at 570, the current row version is set as "GC ready" to state that the current row version is ready to be deleted from memory when accessed by a second thread.

In one embodiment, it may be determined that the current row version is set as "GC ready" and therefore process A2 (process 600) is initiated.

Next, at 575, a check is performed to determine if there is a temporarily stored link to a next row version. In one embodiment, it may be determined that there is a temporarily stored link to a next row version. Therefore, process 500 continues at 580, where the next row version is appointed as current row version. Then, at 585, process 500 is re-initiated from 525 onwards and executed for the row version that is currently appointed as current row version.

In one embodiment, upon performing a check at 575, it may determined that there is no temporarily stored link to a next row version, for example, if the current row version is last in a vertical chain of row versions that is currently traversed. Therefore, process 500 may be discontinued.

Table 1 shows a pseudo code sample that describes the processes executed by a single thread that traverses a vertical chain of a 2-dimensional grid structure, starting from a row version, according to above described mechanism to garbage collect obsolete memory objects:

TABLE 1

```
typedef struct row_version
{
    struct row_version *    vertical_next;
    struct row_version *    horizontal_next;
    struct traninfo *       traninfo;
    char                    data[1];
} ROW_VERSION;
typedef struct traninfo
{
    struct row_version *    vertical_chain;
    int64                   commit_ts;
} TRANINFO;
void
gc_thread_work(TRANINFO *traninfo)
{
    TRANINFO *gc_traninfo = (TRANINFO*)
    mem_alloc(sizeof(TRANINFO));
    ROW_VERSION *ver, *v_next, *v_old;
    v_next = traninfo->vertical_chain;
```

TABLE 1-continued

```
    traninfo->vertical_chain = NULL;
    while (ver = v_next)
    {
        v_next = ver->vertical_next;
        v_old = ver->horizontal_next;
        ver->vertical_next = NULL;
        ver->horizontal_next = NULL;
        if (ver->is_rolled_back == TRUE)
        {
            conditional_memfree(ver, gc_traninfo);
            continue;
        }
        if (v_old && !CAS(&v_old->mark, 0, GC_READY))
        {
            ASSERT(v_old->mark == GC_READY);
            conditional_memfree(v_old, gc_traninfo);
        }
        if (!CAS(&ver->mark, 0, GC_READY))
        {
            ASSERT(ver->mark == GC_READY);
            conditional_memfree(ver, gc_traninfo);
        }
    }
    if(TRANINFO_HAS_ROWS(gc_traninfo)){
        Add gc_traninfo to GC work queue
    }
    else {
        memfree(gc_traninfo);
    }
}
```

Figure 6:
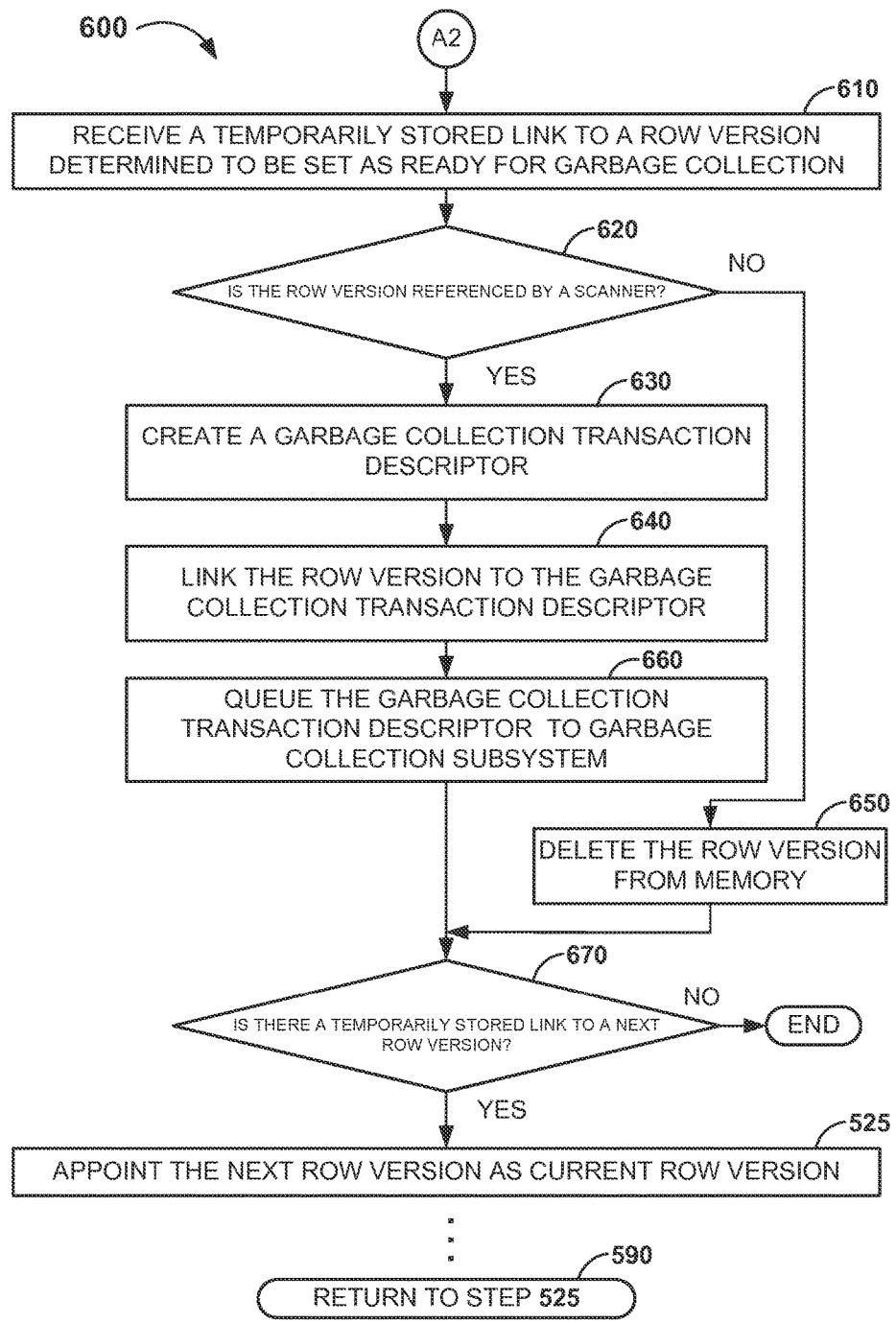
FIG. 6 is a flow diagram illustrating a process to determine scan status of a row version set as ready for garbage collection, according to one embodiment.

FIG. 6 illustrates process 600 that determines scan status of a row version set as ready for garbage collection, according to one embodiment. Process 600 starts at A2 when a row version is determined set as ready for garbage collection ("GC ready"). At 610, a link (pointer) stored temporarily in a local variable is received. The temporarily stored link provides a memory path to a row version set as "GC ready". At 620, it is determined whether the row version is referenced by a scanner. A scanner may scan a row for a particular older version of the row. The older version may be needed for MVCC, that is a common way to increase concurrency and performance by generating a new row version each time a row is updated by a transaction.

In one embodiment, it is determined whether the row version is referenced by a scanner by checking a reference counter (RC) of a row header (ROWHDR). The row header points to the horizontal row of the row version. When scanning a row, the scanner increments the RC of the scanned row. RC may be incremented via a number of increment constructions. For example, the RC may be incremented via atomic increment construct provided by a compiler. The default RC is zero (0). Upon determining that the RC of a row header is bigger than zero, at 630, a garbage collection transaction descriptor (GC_TRANINFO) is created. At 640, the row version is linked to the GC_TRANINFO to form a vertical chain of one or more row versions referenced by a scanner. The process to determine scan status of the row version continues at 660. At 660, the GC_TRANINFO is queued along with a number of transaction descriptors that are to be assigned to a number of threads that form a garbage collection subsystem.

Upon determining that the RC equals zero, at 650, the row version is garbage collected and deleted from the memory to free space for new versions.

Table 2 shows a pseudo code sample that describes the processes executed by a single thread over a memory object (row version) that is determined to be set as ready for garbage collection ("GC ready"):

TABLE 2

```
conditional_memfree(ROW_VERSION *ver, TRANINFO *gc_traninfo)
{
  */
  if (IS _ROW_REFERED_BY_SCAN(ver))
  {
     ver->vertical_next = gc_traninfo->vertical_chain;
     gc_traninfo->vertical_chain = ver;
  }
  else
  {
     memfree(ver);
  }
}
boolean
IS_ROW_REFERED_BY_SCAN(ver)
{
       if (ver->row_header->reference_count > 0)
            return TRUE;
       else
            return FALSE;
}
scan_getnext(SCAN_CONTEXT scan)
{
  /* Un-reference previous row referenced by scan, if any */
  if (SCAN_REFERRING_SOME_ROW(scan))
    SCAN_UNREF_ROW(scan.)
         row = Determine Row to return( )
    SCAN_REF_ROW(scan, row)
    Return Row
}
void
scan_end(SCAN_CONTEXT scan)
{
  if(SCAN_REFERRING_SOME_ROW(scan))
    SCAN_UNREF_ROW(scan)
}
void
SCAN_REF_ROW(scan, row)
{
  scan->referenced_row = row;
  ATOMIC_INCREMENT(row->row_header->reference_count);
}
void
SCAN_UNREF_ROW(scan)
{
  row = scan->referenced_row;
  scan->referenced_row = NULL;
  ATOMIC_DECREMENT(row->row_header->reference_count);
}
boolean
SCAN_REFERRING_SOME_ROW(scan)
{
  if (scan->referenced_row)
    return TRUE;
  else
    return FALSE;
}
```

Process 600 continues at 670, where a check is performed to determine if a link to a next row version is temporarily stored, for example the link to the next row version may be stored in a local variable v_next. In one embodiment, it is determined that a link to a next row version is temporarily stored and, therefore, steps 525-590 of process 500 are executed with reference to the next row version. For example, starting at 525, by appointing the next row version as current row version.

Process 600 ends at 670, upon determining that a link to a next version is not stored. For example, a link to a next row version may not be stored if the current row version is last in a vertical chain of row versions (a next row version does not exist) and, therefore, the current row version does not include a link to a next row version.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
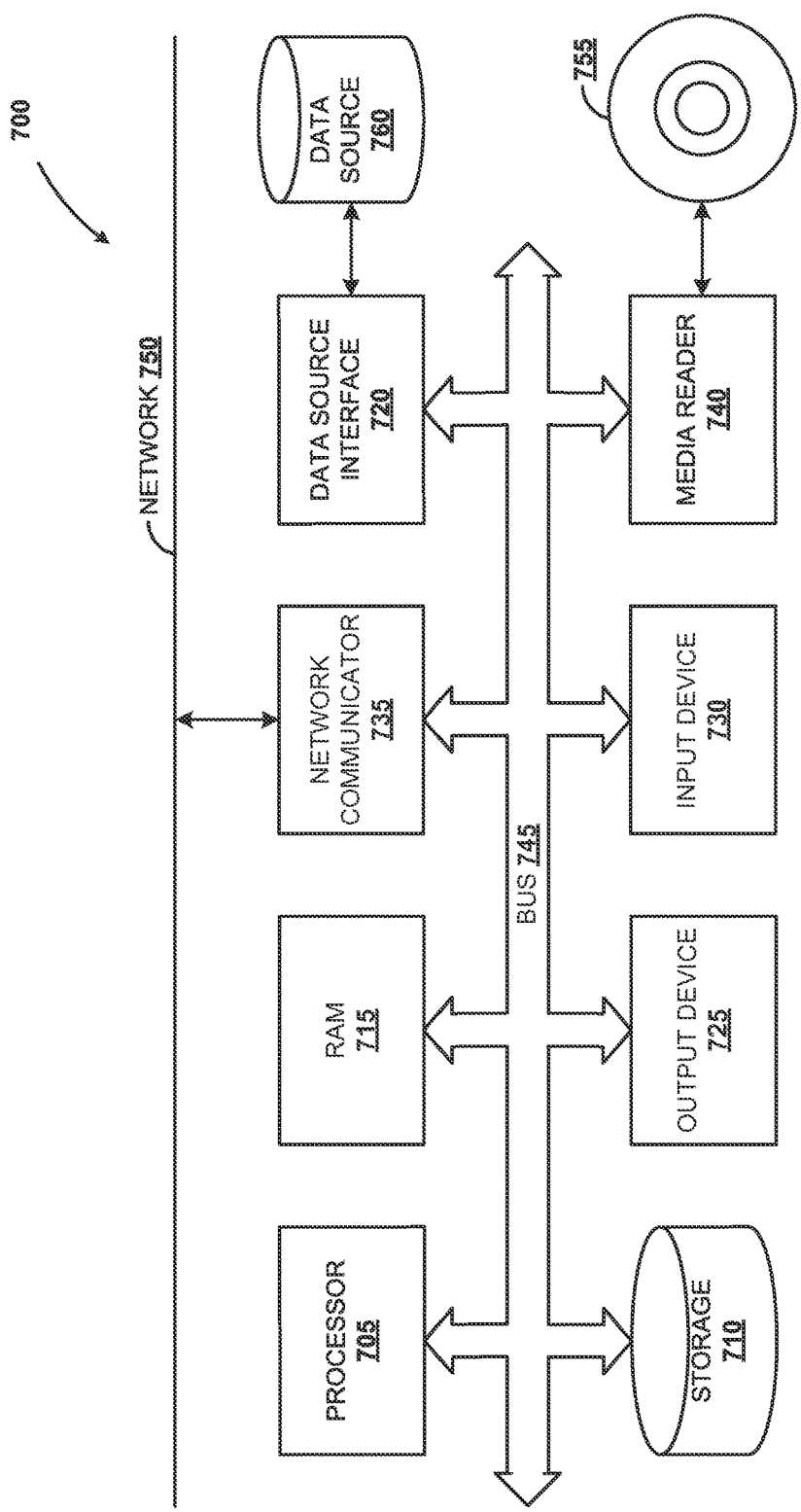
FIG. 7 is a block diagram of an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to delete obsolete versions from memory, the method comprising:
    receiving a transaction descriptor associated with a vertical chain of row versions from a plurality of vertical chains of row versions, wherein the plurality of vertical chains of row versions is intersected with a plurality of horizontal chains of row versions to form a grid structure;
    terminating a link to a current row version in the vertical chain, wherein the vertical chain comprises row versions of multiple rows, and wherein the link to the current row version is included in the transaction descriptor;
    upon determining that the current row version is not a rollback version, terminating a link from the current row version to an older row version in a horizontal chain and terminating a link from the current row version to a next row version in the vertical chain, wherein the horizontal chain comprises row versions of a row;
    upon determining that the older row version is set as ready for garbage collection, deleting the older row version from memory; and
    upon determining that the current row version is set as ready for garbage collection, deleting the current row version from memory.

2. The computer implemented method of claim 1, wherein the current row version is visited by the garbage collection two times at most, when the current row version is not scanned.

3. The computer implemented method of claim 1, wherein a latest row version of the row in the horizontal chain comprising row versions of the row is retained by performing zero additional computational checks.

4. The computer implemented method of claim 3 further comprising:
    determining rollback status of the current row version; and
    upon determining that the current row version is a rollback version, deleting the current row version from memory.

5. The computer implemented method of claim 3, wherein:
    terminating the link to the current row version comprises extracting the pointer to the current row version from the transaction descriptor and temporarily storing locally the pointer to the current row version;
    terminating the link from the current row version to the older row version in the horizontal chain comprises temporarily storing locally the pointer from the current row version to the older row version; and
    terminating the link from the current row version to the next row version in the vertical chain comprises temporarily storing locally the pointer from the current row version to the next row version in the vertical chain.

6. The computer implemented method of claim 3 further comprising:

upon determining that the older row version is not set as ready for garbage collection, setting the older row version as ready for garbage collection to specify the older row version is ready to be deleted from memory; and upon determining that the current row version is not set as ready for garbage collection, setting the current row version as ready for garbage collection to specify the current row version is ready to be deleted from memory.

7. The computer implemented method of claim 3 further comprising:

upon determining that the older row version is set as ready for garbage collection, checking scan status of the older row version;

upon determining that the older row version is not currently scanned, deleting the older row version from memory;

upon determining that the current row version is set as ready for garbage collection, checking scan status of the current row version; and upon determining that the current row version is not currently scanned, deleting the current row version from memory.

8. The computer implemented method of claim 7 further comprising:

upon determining that the older row version is currently scanned, linking the older row version to a garbage collection transaction descriptor; and queuing the garbage collection transaction descriptor to a garbage collection subsystem.

9. The computer implemented method of claim 7 further comprising:

upon determining that the current row version is currently scanned, linking the current row version to a garbage collection transaction descriptor; and queuing the garbage collection transaction descriptor to a garbage collection subsystem.

10. A computer system to delete obsolete row versions from memory, the computer system comprising:

at least one processor and memory for executing program code, the program code comprising:

a vertical chain of row versions comprising one or more versions of multiple rows, wherein a plurality of vertical chains comprises the vertical chain of row versions;

a horizontal chain of row versions comprising one or more versions of a row, wherein a plurality of horizontal chains comprises the horizontal chain of row versions, and wherein the horizontal chain of row versions starts at a latest version of the row; and a grid structure formed by intersecting the plurality of vertical chains and the plurality of horizontal chains; and a garbage collection subsystem that traverses in parallel the vertical chains of row versions to set as ready for garbage collection row versions that are not set as ready for garbage collection, and to delete row versions that are set as ready for garbage collection, wherein number of memory accesses from the garbage collection subsystem to a row version of the grid structure is at most two.

11. The computer system of claim 10 further comprising:

a scanner that scans the grid structure for obsolete row versions, wherein the scanner increments a header reference counter of the horizontal chain from the plurality of horizontal chains before scanning the horizontal chain, and wherein the scanner decrements the header reference counter of the horizontal chain upon scan completion.

12. The computer system of claim 11 further comprising:

a vertical garbage collection (GC) chain of row versions that includes one or more row versions of the vertical chain, wherein header reference counter of a row version from the one or more row versions is greater than zero, and wherein the vertical GC chain is traversed by the garbage collection subsystem.

13. A non-transitory computer readable medium storing instructions, which when executed by at least one processor cause a computer to perform operations comprising:

receive a transaction descriptor associated with a vertical chain of row versions from a plurality of vertical chains of row versions, wherein the plurality of vertical chains of row versions is intersected with a plurality of horizontal chains of row versions to form a grid structure;

terminate a link to a current row version in the vertical chain, wherein the vertical chain comprises row versions of multiple rows, and wherein the link to the current row version is comprised in the transaction descriptor;

upon determining that the current row version is not a rollback version, terminate a link from the current row version to an older row version in a horizontal chain and terminate a link from the current row version to a next row version in the vertical chain, wherein the horizontal chain comprises row versions of a particular row;

upon determining that the older row version is set as ready for garbage collection, delete the older row version from memory; and upon determining that the current row version is set as ready for garbage collection, delete the current row version from memory.

14. The computer readable medium of claim 13, wherein a latest row version of the particular row in the horizontal chain comprising row versions of the particular row is retained by performing zero additional computational checks.

15. The computer readable medium of claim 14 further comprising:

determine rollback status of the current row version; and upon determining that the current row version is a rollback version, delete the current row version from memory.

16. The computer readable medium of claim 14 further comprising:

termination the link to the current row version comprises extracting the pointer to the current row version from the transaction descriptor and temporarily store locally the pointer to the current row version;

termination the link from the current row version to the older row version in the horizontal chain comprises temporarily store locally the pointer from the current row version to the older row version; and termination the link from the current row version to the next row version in the vertical chain comprises temporarily store locally the pointer from the current row version to the next row version in the vertical chain.

17. The computer readable medium of claim 14 further comprising:

upon determining that the older row version is not set as ready for garbage collection, set the older row version as ready for garbage collection to specify the older row version is ready to be deleted from memory; and upon determining that the current row version is not set as ready for garbage collection, setting the current row version as ready for garbage collection to specify the current row version is ready to be deleted from memory.

18. The computer readable medium of claim 14 further comprising:

upon determining that the older row version is set as ready for garbage collection, determine scan status of the older row version;

upon determining that the older row version is not currently scanned, delete the older row version from memory;

upon determining that the current row version is set as ready for garbage collection, determine scan status of the current row version; and upon determining that the current row version is not currently scanned, delete the current row version from memory.

19. The computer readable medium of claim 18 further comprising:

upon determining that the older row version is currently scanned, link the older row version to a garbage collection transaction descriptor; and queue the garbage collection transaction descriptor to a garbage collection subsystem.

20. The computer readable medium of claim 18 further comprising:

upon determining that the current row version is currently scanned, link the current row version to a garbage collection transaction descriptor; and queue the garbage collection transaction descriptor to a garbage collection subsystem.

* * * * *